Patented Dec. 7, 1943

2,335,912

UNITED STATES PATENT OFFICE 2,335,912

TERPENE RESIN

Samuel G. Burroughs, Pittsburgh, Pa., assignor to Pennsylvania Industrial Chemical Corporation, a corporation of Pennsylvania No Drawing. Application August 4, 1939, Serial No. 288,390

11 Claims. (Cl. 260—80)

This invention relates to the polymerization of a terpene starting material to form hydrocarbon resin.

It is known that the terpenes include a variety of hydrocarbons, which are isomers responding in common to the general formula $C_{10}H_{16}$. The content of these several terpenes in the sources therefor, such as the terpentine extracted by bleeding pine trees and known as "gum spirits" and the extract of destructive distillation known as "wood turpentine," differs.

In work conducted experimentally in the production of terpene resins, I have found that the average composition of gum spirits is 70% alpha-pinene and 30% beta-pinene, with an appreciable, but moderate, variation from that proportion in accordance with the source of the gum spirits. In my experiments I have found no substantial content of other terpenes in gum spirits.

In my experimental work, I have found in wood turpentine alpha-pinene, beta-pinene, dipentene, terpinene, and terpinolene. In my experience the proportion of these several constituents in wood turpentine varies widely. This is probably due to the fact that there is variation in the processes by which the wood turpentine is extracted, as well as to different sources of the wood from which extraction is made. As it is commercially available, gum spirits also varies widely in its proportional inclusion of alpha-pinene and beta-pinene, because of variation in the processes by which it is produced.

In my work in terpene resins my attention was directed forcibly to the lack of uniformity in the yield and quality of terpene resin obtained from different lots of gum turpentine. This is most striking in following the simpler polymerization methods. Even in the best specialized processes, designed to give maximum polymerizing impulsion to all the content of a terpene starting material, in my experience the results have been in measure unpredictable, varying widely with one lot of starting material from an optimum yield and quality predicted from polymerization in a different lot of starting material.

Investigating the cause of such lack of uniformity, I fractionated gum spirits and wood turpentine from various sources; and upon subjecting the various fractions to polymerization, made the discovery that, from whatever source or association it was obtained, each of the typical terpenes of those primary starting materials responded uniformly to polymerizing stimuli.

It is possible accurately to isolate the several terpene constituents of gum spirits and wood spirits from either of those starting materials alone, or a mixture of them, by fractionation. This is because these various constituents of the terpene starting materials have boiling points adequately separated for that purpose. When subjected to fractional distillation the various terpene constituents boil in very close approximation to the several temperatures given as follows:

Alpha-pinene boils at 154° C.
Beta-pinene boils at 165° C.
Dipentene boils at 175° C.
Terpinene boils at 179° C.
Terpinolene boils at 184° C.

These various fractions I subjected separately to polymerization with aluminum chloride catalyst, starting at normal room temperature, and permitting the heat of reaction to rise as high as 80° C., if the polymerization was not completed at a lower temperature. The aluminum chloride was added gradually in an amount equal to 5% the weight of the starting material, and the bath was agitated during and after the addition of the catalyst. In each instance there was no inhibition to polymerization at any stage of the process, but on the contrary polymerizing conditions were maintained for as long as there was any evidence of the progress of polymerization.

In recovery, the procedure hereinafter outlined in describing the various steps of my process was followed. The results, checked by making several tests under identical conditions, were as shown in Table A. The results established apparently that, as the turpentines are commercially available and under the simpler polymerization methods, beta-pinene is the true resin-forming constituent in both gum spirits and wood turpentine; that alpha-pinene is under such conditions relatively poor in resin-forming qualities; and that no substantial content of solid resin is obtainable from the constituents of wood turpentine other than beta-pinene, and alpha-pinene.

With the characteristics of beta-pinene in mind, I conceived the idea that, in commercial production of terpene resin, advantage might be obtained by blending with a raw starting material a proportion of isolated beta-pinene. This was with the idea that by so doing economy might result from avoiding complete fractionation of the starting materials, while obtaining improvement sufficiently great to render such procedure commercially desirable.

The results, given in Table B, indicated that a proportional inclusion of beta-pinene with alpha-pinene gave in the yield of solid resin, "heavy-oil" (terpene dipolymer), and in the melting point and color of the solid resin results approximately in accordance with the percentage inclusion of the beta-pinene. This held good with blending in all proportions, provided that the inclusion of beta-pinene was substantial.

As a check to the peculiar properties of beta-pinene, I blended the three other constituents of wood turpentine, namely dipentene, terpinene, and terpinolene. That blend I subjected to the same polymerization procedure that I had followed for the fractionated constituents, and for the blend of beta-pinene and alpha-pinene. The results, given in Table C, showed that blending terpinene, terpinolene, and dipentene presented no advantage over the treatment of those terpenes individually, but on the contrary such procedure appeared to render more pronounced the meager capacity of all of them to polymerize. Tables A, B and C, to which reference has been made, are as follows:

I, therefore, either isolate beta-pinene from gum spirits by fractionation, and subject the approximately pure beta-pinene to fractionation; or alternatively, if the circumstances render it advantageous, enrich gum turpentine with isolated beta-pinene in preparation for polymerization, and polymerize the blend. An example of the former procedure may be given as follows:

Introducing 1000 parts by weight of isolated beta-pinene into a polymerizing vessel, provided with both cooling and agitating means, I gradually added 50 parts by weight of aluminum chloride, while agitating the starting material. The addition of the aluminum chloride was begun at normal room temperature, and throughout the process the temperature was maintained by heat abstraction within the approximate range of 30° C. to 40° C.

After about three-fourths of the aluminum chloride had been introduced, that is about 2 hours after beginning the operation, I added 350 parts by weight of mineral spirits, as representative of a hydrocarbon diluent having a boiling point lower than the "heavy oil" (i. e. dipolymer oil) content of the resultant product. Following complete introduction of the catalyst, which

Table A

| Terpene | Unreacted | Light oil | Heavy oil | Solid resin | Melting point of resin | Color |
|---|---|---|---|---|---|---|
| | Per cent | Per cent | Per cent | Per cent | | |
| Alpha-pinene | 44 | 16 | 11 | 29 | 60° C | ¾ yellow. |
| Beta-pinene | 0 | 0 | 13 | 84.5 | 116° C | ¼. |
| Dipentene | 75 | 0 | 17 | 8 | 66° C | 9 dark brown. |
| Terpinene | 55 | 20 | 20 | 5 | 58° C | 4 brown. |
| Terpinolene | 26 | 30 | 40 | 4 | Soft | 1. |

Table B

| Mixture | Unreacted | Light oil | Heavy oil | Solid resin | Melting point of resin | Color |
|---|---|---|---|---|---|---|
| 65% dipentene<br>35% terpinene<br>Terpinolene | Per cent<br>81 | Per cent<br>8 | Per cent<br>7 | Per cent<br>4 | Soft | 9. |

Table C

| Mixture | Unreacted | Light oil | Heavy oil | Solid resin | Melting point of resin | Color |
|---|---|---|---|---|---|---|
| Alpha-pinene, 67%<br>Beta-pinene, 33% | Per cent<br>7.5 | Per cent<br>30 | Per cent<br>12.5 | Per cent<br>50 | 90° C | ¼. |

It may be explained that the "light oil" distills over under steam distillation in the range of 220° C. to 245° C., and that the "heavy oil" distills over under steam distillation in the range of 245° C. to 260° C. The color intensity, as given in the tables, was in accordance with the coumarone-indene color scale, and the procedure for making color determination in coumarone-indene resins was followed in arriving at the color values given. The melting points of the recovered solid resins were taken by the ball and ring method, and it is to be understood that throughout the specification and claims any given melting point is to be taken as by the ball and ring method, whether or no such method of determination is, in each particular instance, noted.

Referring to the results obtained in the tables, it may be explained that the polymerization of beta-pinene was completed within the temperature range of 30° C. to 40° C., it being unnecessary to carry the batch to higher temperatures.

was done in between 2.5 and 3 hours, the working mixture was agitated for about 5 hours more.

At the end of a total treating period of about 8 hours, polymerization was complete. The reaction was therefore definitely "killed" with about 250 parts by weight of a 2% water solution of hydrochloride acid, and recovery steps were followed. In recovery, the reacted mixture, after being agitated with the dilute hydrochloric acid solution, was washed with pure water. The mixture was allowed to separate, and the water was run off.

The washed solution was then distilled for removal and recovery of the mineral spirits. Distillation was then continued to remove and recover the heavy oil, and to leave solid resin. The proportion and characteristics of the recovered resinous materials (i. e. the heavy oil and the solid resin) were as given in Table A as the products resultant from the polymerization of beta-pinene. It is, however, to be understood that, by discontinuing distillation at a point short of effecting complete removal of the dipolymer oil, I may produce a larger yield of solid resin having a lower melting point.

As an example of an alternative procedure, in accordance with good commercial practice, I blended 600 parts by weight of gum spirits, containing approximately 72% alpha-pinene and 28% beta-pinene with 400 parts by weight of isolated beta-pinene, to make a total of 1000 parts by weight of starting material. The blend thus consisted of approximately 57% beta-pinene and 43% alpha-pinene, and may be considered to be gum spirits enriched for polymerization by an additive content of beta-pinene.

This blend, or enriched gum spirits, I treated by the same polymerization treatment to which I subjected isolated beta-pinene. The only procedural difference was that the light oil present after polymerization, and which was not present after the polymerization of beta-pinene, was distilled off with the mineral spirits for later separation therefrom. The recovery from the polymerization treatment was approximately as follows:

| Unreacted | Light oil | Heavy oil | Solid resin |
|---|---|---|---|
| Per cent 19 | Per cent 7 | Per cent 12 | Per cent 62 |

The solid resin was of about 92° C. melting point (ball and ring), and was of a color intensity of about one-half on the coumarone-indene resin color scale.

I can thus, within the bounds of the polymerization characteristics of isolated beta-pinene, predict the results to be obtained by any proportioned enrichment of gum spirits of determined content with beta-pinene. Thus, I am enabled, by simple and substantially uniform procedure, to make terpene resin in accordance with the dictates of economy under the existing circumstances, and the required characteristics of the product resin.

Dilution during the progress of polymerization, as by addition of an inert hydrocarbon diluent, is naturally of less importance in polymerizing a blend containing a large proportion of alpha-pinene than in polymerizing approximately pure, isolated beta-pinene. If, however, the blend is such as to give more than a 50% yield of solid resin, the diluent should be added in the stage of the process at which the batch becomes highly viscous, in order that the catalyst may not be so coated as to destroy its effectiveness.

Although the blending of isolated beta-pinene with gum spirits may be made in all proportions, provided the content of beta-pinene be substantial, I have found it desirable to blend in such proportions that the beta-pinene is included in greater proportion than the alpha-pinene. With more than 50% of beta-pinene in the blend, and using aluminum chloride under the above-described simple polymerizing conditons, it is possible always to recover solid terpene resin having a melting point (ball and ring) higher than 80° C., which melting point is frequently considered the dividing line above which the resin becomes non-tacky and clean to handle.

All the standard halide polymerization catalysts, such as stannic chloride, antimony pentachloride, and ferric chloride are to be considered the substantial equivalents of aluminum chloride in the process. I have, however, found aluminum chloride to be the most effective catalyst for terpenes, both in shortening the time required for polymerization and in the yield of solid resin produced.

An important advantage derived from my invention, or discovery, is that to date special uses for isolated beta-pinene have not been found; whereas alpha-pinene has specialized utility as a starting material in the manufacture of synthetic camphor, and dipentene, terpinene, and terpinolene have specialized utility in, or as, special solvents. Therefore, specifically to use beta-pinene, either in isolation or as an enriching content in polymerization procedure for the production of terpene resin, results in leaving other terpene constituents free for more appropriate utilization, while taking advantage of the qualities which beta-pinene peculiarly possesses.

It is of course possible to add wood turpentine in some proportion to beta-pinene, or a beta-pinene blend, before polymerization for the sake of the content of alpha-pinene and beta-pinene in the wood turpentine. Such course presents no merit over the enrichment of gum spirits, since it involves merely a dilution resulting in a decreased yield of useful polymerization products, it is to be considered as within the ambit of claims directed to the enrichment of gum spirits as a preliminary step in a polymerization process for the production of terpene resin.

It is also to be understood that gum spirits may be enriched for polymerization by distilling off less than all its content of alpha-pinene, rather than by continuing distillation to the stage of isolating beta-pinene and adding it in apportioned quantity to unfractionated gum spirits. Such first mentioned procedure makes accurate proportioning more difficult than if the beta-pinene is isolated.

I claim as my invention:

1. The herein described method of producing terpene resin by polymerization catalytically induced by means of a polymerization catalyst which is the halide of a polyvalent metal and which is capable of being hydrolyzed by water to give an acid reaction with agitation and under heat-abstracting conditions in a turpentine starting liquid consisting in substantial entirety of beta-pinene.

2. The herein described method of producing terpene resin by polymerization catalytically induced by means of aluminum chloride with agitation and under heat-abstracting conditions in a turpentine starting liquid consisting in substantial entirety of beta-pinene.

3. The method of preparing a resin which comprises bringing a beta-pinene terpene fraction containing beta-pinene in excess of 50% of the terpenes present into reactive contact with a metal halide polymerization catalyst of a polyvalent metal which is capable of being hydrolyzed by water to give an acid reaction, in a liquid reaction medium inert to beta-pinene and non-polymerizing under the conditions of the reaction to form a dispersion of a hard resin polymer of beta-pinene, and separating the catalyst from the said resin.

4. The method of preparing a resin which comprises bringing a beta-pinene terpene fraction containing beta-pinene in excess of 50% of the terpenes present into reactive contact with aluminum chloride as a polymerization catalyst in a liquid reaction medium inert to beta-pinene and non-polymerizing under the conditions of the reaction, to form a dispersion of a hard resin polymer of beta-pinene, and separating the catalyst from the said resin.

5. The method of preparing a resin which comprises bringing a beta-pinene terpene fraction containing beta-pinene in excess of 50% of the terpenes present into reactive contact with aluminum chloride in a liquid reaction medium inert to beta-pinene and non-polymerizing under the conditions of the reaction to form a dispersion of a hard resin polymer of beta-pinene, washing the dispersion with water until the catalyst has been substantially completely removed, and recovering the resin from the purified dispersion.

6. A hard, substantially colorless resin formed by polymerizing a beta-pinene terpene fraction containing beta pinene in excess of 50% of the terpenes present under the influence of a metal halide polymerizing catalyst of a polyvalent metal which is capable of being hydrolyzed by water to give an acid reaction, in a liquid reaction solvent medium inert to beta-pinene and non-polymerizing under the reaction conditions, and recovering the resin so formed.

7. A hard resin formed by polymerizing a beta-pinene terpene fraction containing beta-pinene in excess of 50% of the terpenes present under the influence of aluminum chloride in a liquid reaction solvent medium inert to beta-pinene and non-polymerizing under the reaction conditions, and recovering the resin so formed.

8. The method of preparing a resin which comprises bringing a liquid beta-pinene terpene fraction containing beta-pinene in excess of 50% of the terpenes present into reactive contact with a polymerization catalyst which is a halide of a polyvalent metal and which is capable of being hydrolyzed by water to give an acid reaction to form a hard resin polymer of beta-pinene, and recovering the resin so formed.

9. The method of preparing a resin which comprises bringing a liquid beta-pinene terpene fraction containing beta-pinene in excess of 50% of the terpenes present into reactive contact with aluminum chloride as a polymerization catalyst to form a hard resin polymer of beta-pinene, and recovering the resin so formed.

10. A hard resin formed by polymerizing a liquid beta-pinene terpene fraction containing beta-pinene in excess of 50% of the terpenes present under the influence of aluminum chloride as a polymerization catalyst therefor, and recovering the resin so formed.

11. A hard resin formed by polymerizing a liquid beta-pinene terpene fraction containing beta-pinene in excess of 50% of the terpenes present under the influence of a polymerization catalyst which is the halide of a polyvalent metal and which is capable of being hydrolyzed by water to give an acid reaction, and recovering the resin so formed.

SAMUEL G. BURROUGHS.